J. R. SHIRREFFS.
LIMITING DEVICE FOR SPOTLIGHTS.
APPLICATION FILED MAY 28, 1917.

1,412,544.

Patented Apr. 11, 1922.

INVENTOR
JAMES R. SHIRREFFS by: Arthur P. Knight his Attorney.

UNITED STATES PATENT OFFICE.

JAMES R. SHIRREFFS, OF LOS ANGELES, CALIFORNIA.

LIMITING DEVICE FOR SPOTLIGHTS.

1,412,544.  Specification of Letters Patent.  Patented Apr. 11, 1922.

Application filed May 28, 1917. Serial No. 171,349.

*To all whom it may concern:*

Be it known that I, JAMES R. SHIRREFFS, a citizen of the United States, residing at Los Angeles, in the county of Los Angeles and State of California, have invented a new and useful Limiting Device for Spotlights, of which the following is a specification.

This invention relates to means for supporting or mounting spotlights on the windshield frame or other part of an automobile, and the main object of the invention is to provide means for limiting the operation of the spotlight to prevent the light being thrown in certain prescribed zones, in order to comply with legal requirements and to avoid the danger and inconvenience to the public which would result from unlimited operation of the light.

The light from a spotlight or headlight, being concentrated, is apt to produce a disagreeable and blinding glare when thrown directly in front of the vehicle at such height as to reach the eyes of parties approaching either in vehicles or afoot, and operation of the lights within certain zones directly in front of the vehicle has for this reason been prohibited by statute in some places. My invention provides a spotlight or headlight mounting which prevents the light from being directed to any point in a certain zone, which may be determined by conditions of safety or by legal requirements, and to permit operation of the lighting means so that the light may be directed to any point outside of such zone, for example at either side of such zone, in order to temporarily illuminate objects alongside the road, such as road signs, house numbers or other objects which may be at such elevation as to require the tipping of the light in a manner that would not be permissible or safe when the light is thrown forward.

The accompanying drawings illustrate an embodiment of my invention and referring thereto:

Figure 1:
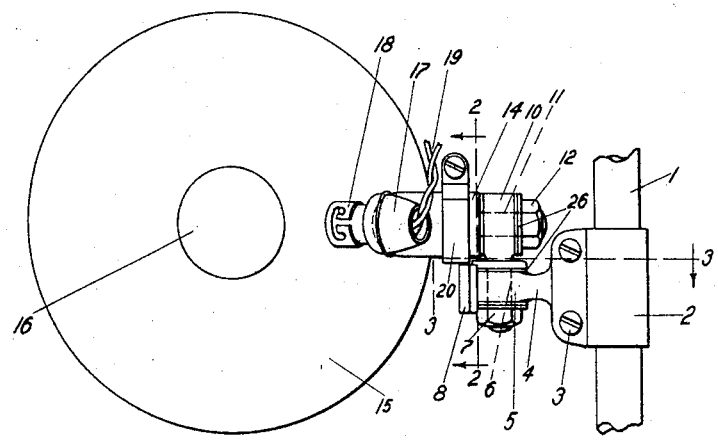
Fig. 1 is a rear elevation of a spotlight with my improved mounting.
Figure 3:
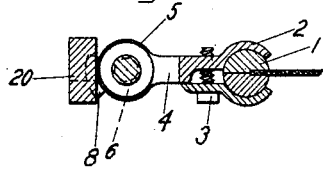
Fig. 3 is a section on line 3—3 in Fig. 1.

The spotlight, together with the devices for controlling the movement thereof, may be mounted on the windshield frame 1 or any other part of a vehicle, by means of a clamp 2, which may be secured in any desired position on such part by means of bolts 3. Clamp 2 is provided with an arm 4, carrying a bearing 5 for a vertical stud 6 on one end of which screws a nut 7 and the other end of which is formed as a bearing 10, said stud acting as a pivot about which the lamp may be swung in a horizontal plane. Bearing 5 has a projecting segment 8 adapted to engage with other means hereinafter described to limit the motion of the lamp in a vertical plane when it is directed in front of the vehicle.

A stud 11 extends through bearing 10, said stud being formed at one end of a cylindrical member 14 connected to the lamp 15, and having a nut 12 screwing on the end thereof. Said stud acts as a pivot about which the lamp may be swung in a vertical plane, subject to the limitations imposed on such movement by the limiting devices. Bearings 5 and 10 may be provided with suitable washers 26, and nuts 7 and 12 may be tightened sufficiently to hold the lamp rigid in any desired position under conditions of use, but to permit it to be moved by the hand. The connection of lamp holder 14 to bearing or support 5 by means of member 10, pivotally connected to both the lamp holder and the support, constitutes a universal joint mounting for the lamp, permitting the lamp to be swung both vertically and horizontally.

For this purpose lamp 15 is provided with handle means 16 so that it may be operated manually about either its horizontal or its vertical pivot. The electric connections for the lamp may be made by means of a plug 17 fitting in a socket 18 and connected by cord 19 to the lighting circuit of the vehicle.

A collar 20 is mounted on the cylindrical member 14 in such position as to engage with the segment 8 when the lamp is pointed in front of the vehicle said collar preferably being split as at 21 and provided with a bolt 22 connecting two turned-up flanges 24 on said collar, so that it may be secured in any desired position on the member 14. Said collar is of sufficient thickness throughout a projecting part 25 of its circumference to strike against segment 8 while the remainder is cut away as at 23 so as to allow its free passage by said segment.

The operation is as follows:

Under normal conditions it is desired to throw the spotlight directly in front of the vehicle, and when in this position it is undesirable and in some places against the law to permit its being tilted to such an angle that it will shine in the faces of pedestrians or other drivers. With my invention, when the lamp is in this position such undesirable tilting of the lamp is prevented by the projecting part 25 of collar 20 striking the segment 8. The point at which it will strike and prevent further movement may be adjusted by varying the position of said collar on the cylindrical member 14. For example, if the law in a certain State requires that the lamp must not be capable of being tilted so that the beam of light will strike over a given height at a given distance directly in front of the vehicle, said collar may be adjusted so that the projecting portion 25 will strike the segment 8 when this limit is reached, provided the studs 6 and 11 are in the zone or portion of their horizontal swinging movement in which the projections 8 and 25 are in engaging relation.

Figure 4:
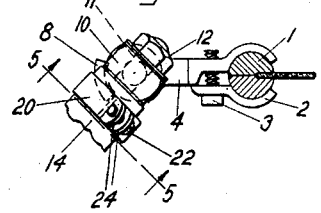
Fig. 4 is a plan view of the mounting, showing the parts in a different position from that shown in the preceding figures.
Figure 2:
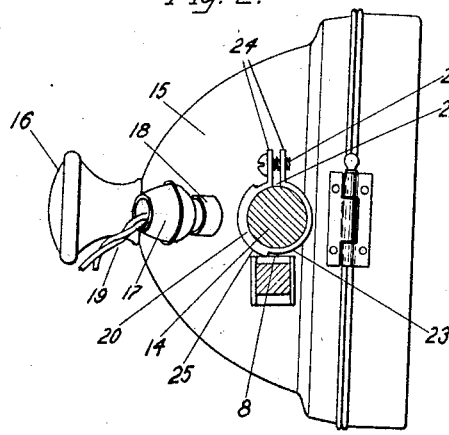
Fig. 2 is a section on line 2—2 in Fig. 1.
Figure 5:
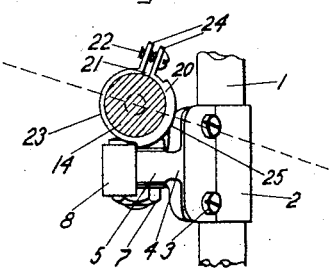
Fig. 5 is a section on line 5—5 in Fig. 4.

It is often desirable, however, to tilt the lamp to a higher angle toward the side of the road and this is provided for in my invention, as shown in Figs. 4 and 5, in which the lamp is swung back in a horizontal plane. The projection 25 then passes out of engagement with the top of segment 8, which permits the lamp to be tilted to a greater angle, as shown by the dotted line in Fig. 5. As shown in Fig. 5, this tilting is then limited by said projection striking against the rear of said segment, but by swinging the lamp still further to the rear, the parts may be moved so as to permit the lamp to be swung vertically throughout a complete circle, without said projection striking said segment.

What I claim is:

1. A mounting for vehicle lights, comprising a bearing, a member mounted to swing horizontally on said bearing, a lamp-holding means pivotally mounted on said member to swing vertically thereon, and means on said bearing and on said lamp-holding means for limiting the vertical swinging motion of the lamp-holding means when the latter is in a certain zone of its horizontal swinging movement.

2. A mounting for vehicle lights, comprising a bearing provided with a lateral projection, a stud mounted to swing horizontally on said bearing, a second stud pivotally mounted on said first named stud to swing vertically thereon and provided with means for supporting a lamp, and with projecting means for engaging the projecting means on said bearing when the said studs are in a certain zone of the horizontal swinging motion thereof, to limit the vertical swinging motion of the lamp.

3. A mounting for vehicle lights, comprising a bearing, a member mounted to swing horizontally on said bearing, a lamp-holding means pivotally mounted on said member to swing vertically thereon, and means on said bearing and on said lamp-holding means for limiting the vertical swinging motion of the lamp-holding means when the latter is in a certain zone of its horizontal swinging movement, said means on the lamp-holding means being adjustable thereon to vary the zone to which the vertical swinging motion is thus limited.

4. A mounting for vehicle headlights, comprising a bearing, a lampholder, a member pivotally connected to said bearing and to said lamp holder in such manner as to provide for vertical and horizontal swinging movement of the lamp holder, and inter-engaging means on said bearing and on said lamp holder to limit vertical swinging movement of the lamp holder when the latter is in a certain zone of its horizontal swinging movement.

5. A mounting for vehicle headlights, comprising a support, a universal joint supporting the headlight on said support, to enable the headlight to swing vertically and horizontally, and means for limiting the vertical swinging movement of the headlight when it is in a certain zone of its horizontal swinging movement.

In testimony whereof I have hereunto set my hand, at Los Angeles, California, this 19th day of May, 1917.

JAMES R. SHIRREFFS.